(12) United States Patent
Jang (10) Patent No.: US 11,551,069 B2
(45) Date of Patent: Jan. 10, 2023

(54) PROCESSING SYSTEM (71) Applicant: SK hynix Inc., Gyeonggi-do (KR)

(72) Inventor: Jae-Hyeok Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 638 days.

(21) Appl. No.: 16/670,645

(22) Filed: Oct. 31, 2019

(65) Prior Publication Data

US 2020/0210819 A1 Jul. 2, 2020

(30) Foreign Application Priority Data

Dec. 31, 2018 (KR) ........................ 10-2018-0173358

(51) Int. Cl.
*G06N 3/063* (2006.01)
*G06N 3/04* (2006.01)

(52) U.S. Cl.
CPC .............. *G06N 3/063* (2013.01); *G06N 3/04* (2013.01)

(58) Field of Classification Search
CPC ........ G06N 3/063; G06N 3/04; G06N 3/0454; G06F 17/153
See application file for complete search history.

(56) References Cited

U.S. PATENT DOCUMENTS

| 2018/0082181 | A1 | 3/2018 | Brothers et al. | |
| 2018/0131946 | A1* | 5/2018 | Lee | H04N 19/169 |
| 2019/0303757 | A1* | 10/2019 | Wang | G06N 3/063 |
| 2020/0234124 | A1* | 7/2020 | Park | G06N 3/0481 |

FOREIGN PATENT DOCUMENTS

| KR | 10-2018-0009204 | 1/2018 |
| KR | 10-2018-0060149 | 6/2018 |

OTHER PUBLICATIONS

Parashar, Angshuman, et al. "SCNN: An accelerator for compressed-sparse convolutional neural networks." ACM SIGARCH computer architecture news 45.2 (2017): 27-40. (Year: 2017).*

* cited by examiner

*Primary Examiner* — Seokjin Kim
(74) *Attorney, Agent, or Firm* — IP & T Group LLP (57) ABSTRACT

An image filtering processing system includes a temporary memory; a flow controller configured to control a feature and a weight to be stored at a point of the temporary memory, and, when at least one of the feature and the weight has a value of 0, to control next feature and next weight to be overwritten at the point; and a processing element configured to perform a multiplication operation on a value of the feature and a value of the weight in the temporary memory and an addition operation on the multiplication result.

14 Claims, 6 Drawing Sheets

| Point | Feature | Weight | Boundary Flag |
|---|---|---|---|
| 0 | 1 | 17 | 0 |
| 1 | 5 | 0 | 0 |
| 2 | 0 | 0 | 0 |
| 3 | 6 | 20 | 0 |
| 4 | 0 | 17 | 1 |
| 5 | 6 | 0 | 1 |
| 6 | 3 | 0 | 1 |
| 7 | 0 | 20 | 1 |
| 8 | 3 | 17 | 0 |
| 9 | 0 | 0 | 0 |
| 10 | 4 | 0 | 0 |
| 11 | 8 | 20 | 0 |
| 12 | 5 | 17 | 1 |
| 13 | 0 | 0 | 1 |
| 14 | 6 | 0 | 1 |
| 15 | 10 | 20 | 1 |
| ... | ... | ... | ... |
| 32 | 11 | 17 | 0 |
| 33 | 15 | 0 | 0 |
| 34 | 12 | 0 | 0 |
| 35 | 0 | 20 | 0 |

Table 530:

| Point | Feature | Weight | Boundary Flag | Boundary |
|---|---|---|---|---|
| 0 | 1 | 17 | 0 | 1st Boundary |
| 1 | 6 | 20 | 0 | 2nd Boundary |
| 2 | 0 | 0 | 1 | 3rd Boundary |
| 3 | 3 | 17 | 0 | |
| 4 | 8 | 20 | 0 | 4th Boundary |
| 5 | 5 | 17 | 1 | 5th Boundary |
| 6 | 10 | 20 | 1 | 6th Boundary |
| 7 | 6 | 17 | 0 | 7th Boundary |
| 8 | 11 | 20 | 0 | |
| 9 | 12 | 20 | 1 | 8th Boundary |
| 10 | 14 | 20 | 0 | 9th Boundary |
| 11 | 10 | 17 | 1 | |
| 12 | 15 | 20 | 1 | |
| 13 | 11 | 17 | 0 | |

Table 430:

| Point | Feature | Weight | Boundary Flag | Boundary |
|---|---|---|---|---|
| 0 | 1 | 17 | 0 | |
| 1 | 5 | 0 | 0 | 1st Boundary |
| 2 | 0 | 0 | 0 | |
| 3 | 6 | 20 | 0 | |
| 4 | 0 | 17 | 1 | 2nd Boundary |
| 5 | 6 | 0 | 1 | |
| 6 | 3 | 0 | 1 | |
| 7 | 0 | 20 | 1 | 3rd Boundary |
| 8 | 3 | 17 | 0 | |
| 9 | 0 | 0 | 0 | |
| 10 | 4 | 0 | 0 | 4rd Boundary |
| 11 | 8 | 20 | 1 | |
| 12 | 5 | 17 | 1 | |
| 13 | 0 | 0 | 1 | |
| 14 | 6 | 0 | 1 | |
| 15 | 10 | 20 | ... | |
| ... | ... | ... | ... | |
| 32 | 11 | 17 | 0 | 9th Boundary |
| 33 | 15 | 0 | 0 | |
| 34 | 12 | 0 | 0 | |
| 35 | 0 | 20 | 0 | |

FIG. 6

PROCESSING SYSTEM

CROSS-REFERENCE TO RELATED APPLICATION

This application claims priority under 35 U.S.C. § 119 to Korean Patent Application No. 10-2018-0173358 filed on Dec. 31, 2018, which is incorporated herein by reference in its entirety.

BACKGROUND

1. Field

Exemplary embodiments relate to a processing system.

2. Discussion of the Related Art

A convolution neural network (CNN) is a processing system mainly used for image recognition and analysis. This processing system requires a convolution operation that extracts a feature from an image with a specific filter, by using a matrix multiplication unit to perform multiplication and addition operations. When a dense image and a filter are used, that is, when data has a small number of 0's (i.e., data has less sparsity), such an operation unit may be efficiently used, but most images and filters used in the processing system have sparsity of about 30% to about 70%.

When the sparsity increases, data includes a large number of zero values (i.e., 0's). The zero values have no influence on result values of the multiplication and addition operations, but may increase unnecessary latency and cause current consumption.

SUMMARY

Various embodiments are directed to a technology for improving the performance of a processing system and reducing current consumption.

In an embodiment, a processing system may include a temporary memory; a flow controller configured to control a feature and a weight to be stored at a point of the temporary memory, and, when at least one of the feature and the weight has a value of 0, to control next feature and next weight to be overwritten at the point; and a processing element configured to perform a multiplication operation on a value of the feature and a value of the weight in the temporary memory and an addition operation on the multiplication result.

In another embodiment, a processing system may include a temporary memory including a plurality of points; a flow controller configured to control a feature, a weight, and a boundary flag to be stored at a point of the temporary memory, and, when at least one of the feature and the weight has a value of 0, to control next feature and weight to be overwritten at the point; and a processing element configured to perform a multiplication operation on a value of a feature and a value of a weight stored at the same point in the temporary memory, and an addition operation on multiplication operation results of the same boundary.

In further another embodiment, a processing system may include a temporary memory; a flow controller configured to control a feature and a weight to be stored at a point of the temporary memory, and, when at least one of a next feature and a next weight to be stored at the point of the temporary memory includes a value of 0, to control the next feature and the next weight not to be stored in the temporary memory; and a processing element configured to perform a multiplication operation on a value of the feature and a value of the weight, which are stored in the temporary memory, and an addition operation on the multiplication result.

In a still further another embodiment, a processing system may include a memory suitable for storing image data and filter data associated with filtering of the image data, the image data including a plurality of features, the filter data including weight values; a cache memory suitable for loading the image data and the filter data from the memory to store the image data; a temporary memory; and a flow controller suitable for reading the image data and the filter data, detecting whether a pair of each feature and corresponding weight value includes a specific logic value, and overwriting the pair to a certain region of the temporary memory when it is determined that one of the pair includes the specific logic value.

In accordance with the embodiments, it is possible to improve the performance of the processing system and reduce current consumption.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Throughout the specification, when one element is referred to as being 'connected to' or 'coupled to' another element, it may indicate that the former element is directly connected or coupled to the latter element or electrically connected or coupled to the latter element with another element interposed therebetween. Furthermore, when an element "includes" or "comprises" a component, it means that the element does not exclude another component but may further include or comprise another component, unless referred to the contrary. Moreover, although components described in the specification are represented in the form of a singular form, the present embodiment is not limited thereto, but the corresponding components may also be represented in the form of a plural form.

Figure 1:
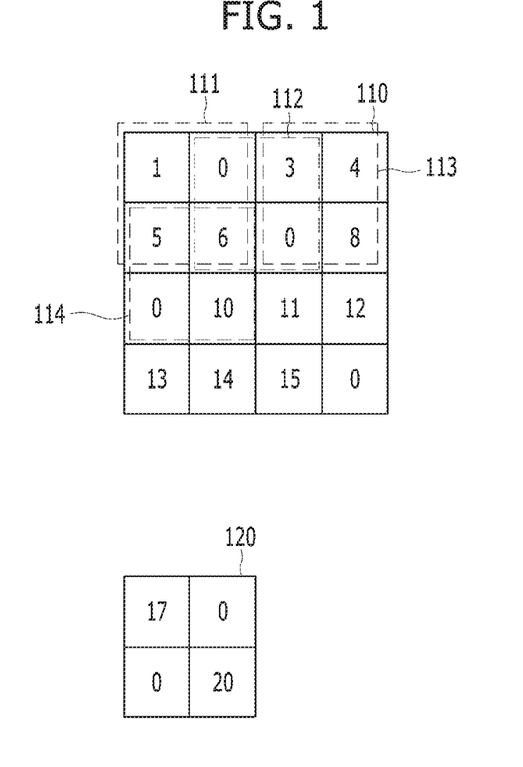
FIG. 1 is a diagram illustrating a convolution operation performed in a processing system.

FIG. 1 is a diagram illustrating a convolution operation performed in a processing system.

In FIG. 1, a reference numeral 110 may represent an image (or image data). For example, a size of the image 110 is 4×4. A reference numeral 120 may represent a filter (or filter data). For example, a size of the filter 120 is 2×2. Values included in the image may be called features and values included in the filter may be called weights. The image 110 may include 16 features and the filter 120 may include 4 weights.

The convolution operation may be performed in such a manner that the image 110 and the filter 120 overlap each other as indicated by dotted lines 111 to 114. The operation in which the image 110 and the filter 120 overlap each other as indicated by the dotted line 111 may have a result value of 137 (=1×17+5×0+0×0+6×20).

Furthermore, the operation in which the image 110 and the filter 120 overlap each other as indicated by the dotted line 112 may have a result value of 0 (=0×17+6×0+3×0+0×20). That is, the operation result of the $1^{st}$ boundary 111 may be 137 and the operation result of the $2^{nd}$ boundary 112 may be 0. Similarly, the operation result of the $3^{rd}$ boundary 113 may be 211 (=3×17+0×0+4×0+8×20) and the operation result of the $4^{th}$ boundary 114 may be 285 (=5×17+0×0+6×0+10×20).

In the convolution operation, it may be seen that when at least one of the features and the weights is 0, it has no influence on an operation result value of a corresponding boundary. For example, in the $1^{st}$ boundary operation (1×17+<u>5×0+0×0</u>+6×20=137), it may be seen that the underlined part in which at least one of the features and the weights is 0 has no influence on the operation result 137.

Figure 2:
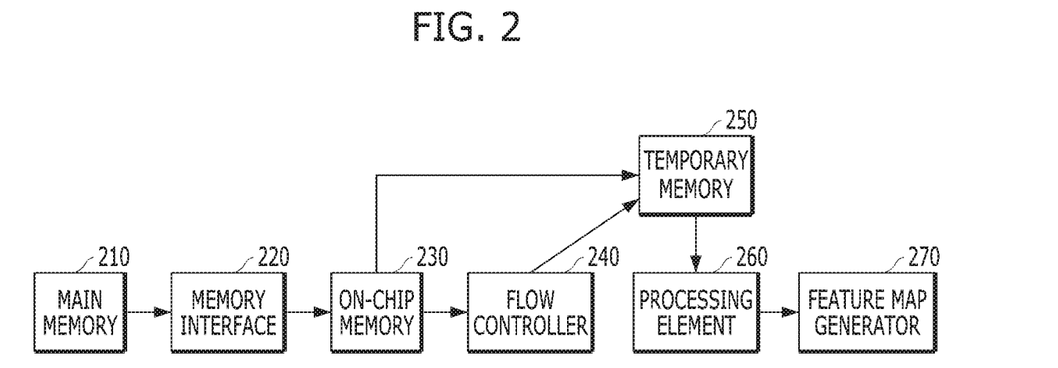
FIG. 2 is a diagram illustrating a processing system in accordance with an embodiment.

FIG. 2 is a diagram illustrating a processing system in accordance with an embodiment.

Referring to FIG. 2, the processing system may include a main memory 210, a memory interface 220, an on-chip memory 230, a flow controller 240, a temporary memory 250, a processing element 260, and a feature map generator 270.

The main memory 210 may be a large capacity memory that stores an image, a filter, and the like. As the main memory 210, a dynamic random access memory (DRAM) may be used and other types of memories may also be used.

The memory interface 220 may be used to read an image and a filter required for an operation from the main memory 210 and to shift the read image and filter to the on-chip memory 230. The memory interface 220 may include a memory controller and a protocol for accessing the main memory 210 and the on-chip memory 230.

The on-chip memory 230 may be a memory that loads some data to be processed by the processing element 260 from the main memory 210 and stores the loaded data. The on-chip memory 230 may be a kind of large capacity cache memory used to minimize access latency between the processing element 260 and the main memory 210. The large capacity may represent that the capacity of the on-chip memory 230 is larger than that of the temporary memory 250, and the capacity of the on-chip memory 230 may be smaller than that of the main memory 210. As the on-chip memory 230, a static random access memory (SRAM) may be used.

The flow controller 240 may read an image and a filter stored in the on-chip memory 230 and write the read image and filter in the temporary memory 250. The flow controller 240 may perform an operation for allowing an operation for a corresponding value to be skipped when a value of a feature or a weight is 0. Further, the flow controller 240 may perform an operation for duplicating a feature and a weight of the on-chip memory 230 in a process of loading the feature and the weight to the temporary memory 250. A detailed operation of the flow controller 240 will be described below.

The temporary memory 250 may be a memory that temporarily stores a feature and a weight to be processed by the processing element 260. The temporary memory 250 may be a cache memory that is directly accessed by the processing element 260. That is, when the temporary memory 250 is a level 1 cache, the on-chip memory 230 may be a level 2 cache. The temporary memory 250 may include a plurality of points and store features, weights, and boundary flags indicating boundaries between the features and the weights in the respective points. The temporary memory 250 may be a scratch pad.

The processing element 260 may perform an operation that multiplies features and weights stored at the same point of the temporary memory 250 and sums multiplication results within the same boundary.

The feature map generator 270 may perform post-processing the convolution operation result of the processing element 260. The feature map generator 270 may perform functions such as pooling for finding an average or maximum value on a pixel-by-pixel basis, an activation function such as a rectified linear unit (ReLU) and a sigmoid function for filtering data based on a threshold value, and a normalization function for filtering a value deviating from a result value.

For fast parallel processing, the processing system may include a plurality of elements in parallel, such as a plurality of flow controllers 240, a plurality of temporary memories 250, and a plurality of processing element 260.

The processing system may be implemented with one or a plurality of integrated circuit chips. For example, the entire processing system may be included in one integrated circuit chip in the form of a system on chip. Alternatively, the processing system may be implemented with a plurality of integrated circuit chips in such a manner that the main memory 210 is included in one integrated circuit chip and the other elements 220, 230, 240, 250, 260, and 270 are included in another integrated circuit chip.

Figure 3:
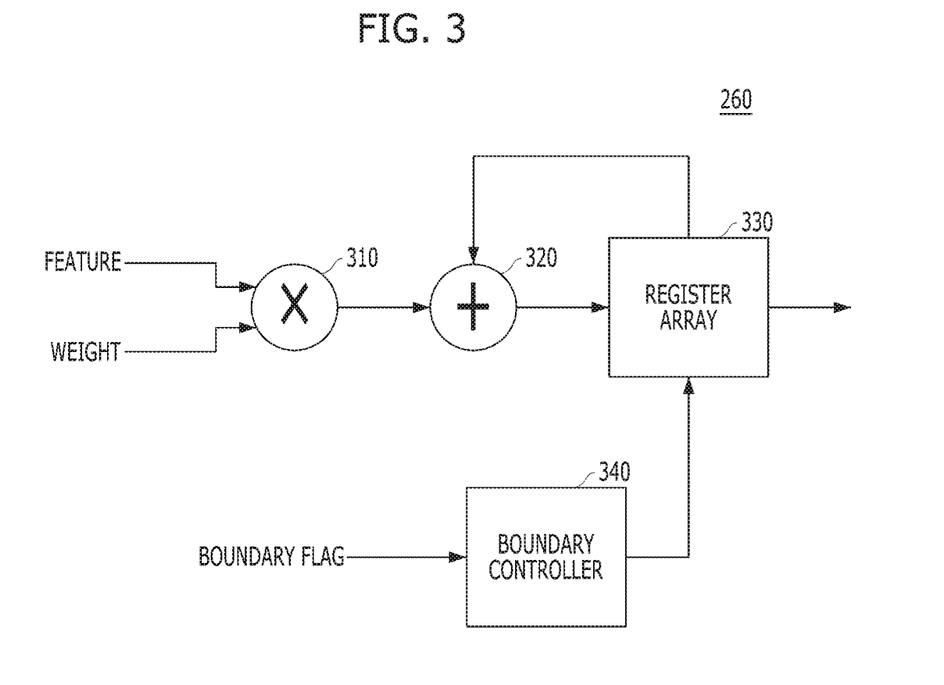
FIG. 3 is a diagram illustrating a processing element of FIG. 2.

FIG. 3 is a diagram illustrating the processing element 260 of FIG. 2.

Referring to FIG. 3, the processing element 260 may include a multiplier 310, an adder 320, a register array 330, and a boundary controller 340.

The multiplier 310 may multiply the value of a feature and the value of a weight received from the temporary memory 250. The multiplier 310 may multiply the value of a feature and the value of a weight stored at the same point of the temporary memory 250.

The adder 320 may add the multiplication result of the multiplier 310 and a value provided from the register array 330.

The boundary controller 340 may receive a boundary flag and control the register array 330 such that multiplication results within the same boundary may be added by the adder 320. Further, the boundary controller 340 may control the register array 330 such that the addition operation result may be outputted from the register array 330 for each boundary.

The register array 330 may receive and store the addition operation result of the adder 320. When a boundary is changed, a value stored in the register array 330 may be outputted to the feature map generator 270 of FIG. 2 and then may be initialized to '0'.

As a consequence, the processing element 260 may perform the convolution operation for each boundary as described in FIG. 1.

Figure 4A:
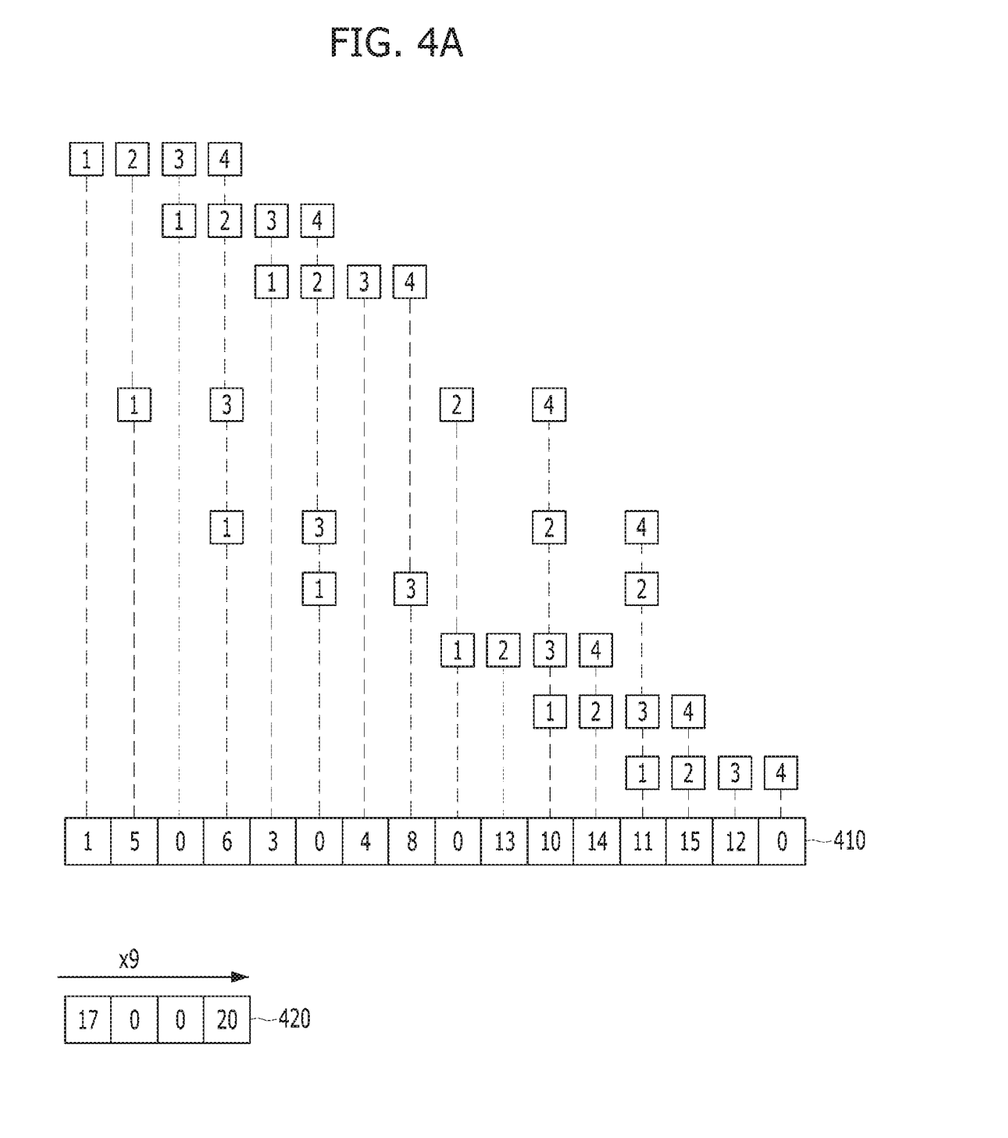
FIGS. 4A and 4B are diagrams illustrating a process in which a flow controller reads an image and a filter stored in an on-chip memory and writes the read image and filter in a temporary memory.
Figure 4B:
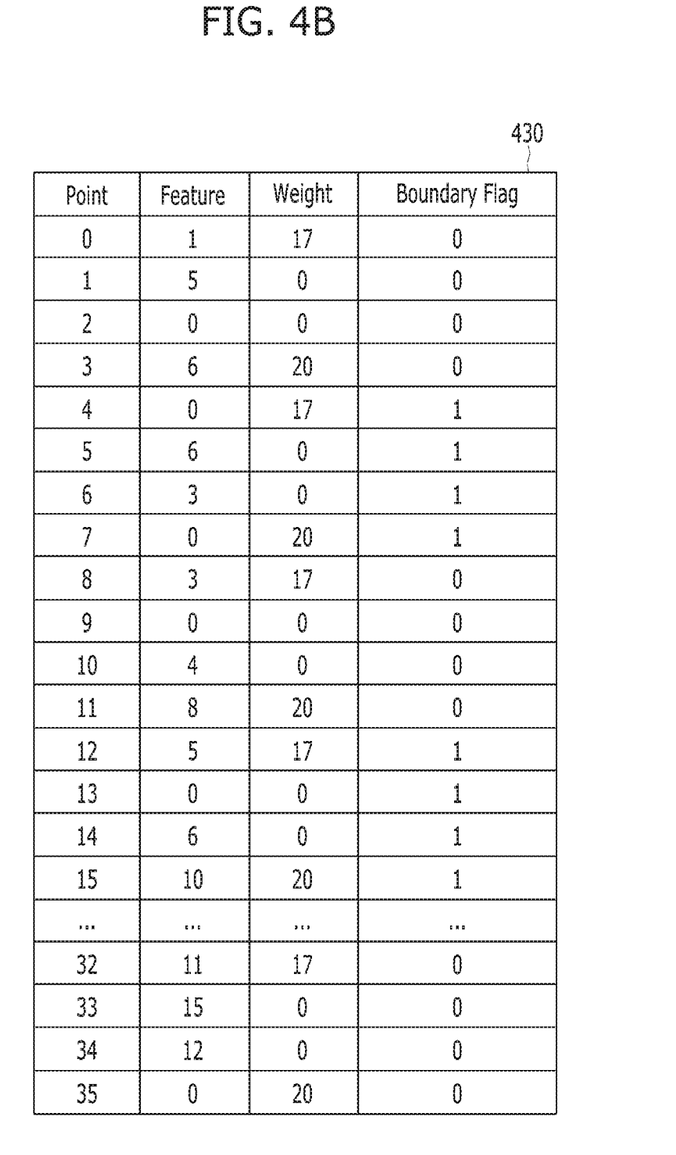

FIGS. 4A and 4B are diagrams illustrating a process in which the flow controller 240 reads an image and a filter stored in the on-chip memory 230 and writes the read image and filter in the temporary memory 250. By way of example, FIG. 4A and FIG. 4B illustrate that the flow controller 240 does not use a zero-skipping scheme in which a zero value is skipped.

In FIG. 4A, a reference numeral 410 may represent that the image 110 having a size of 4×4 in FIG. 1 is stored in the on-chip memory 230 of FIG. 2. A reference numeral 420 may represent that the filter 120 having a size of 2×2 as shown in FIG. 1 is stored in the on-chip memory 230. In other words, 410 represents an image stored in the on-chip memory 230, and 420 represents a filter stored in the on-chip memory 230.

The flow controller 240 may read the image 410 from the on-chip memory 230 in the order of 1, 2, 3, and 4 for each boundary. That is, the flow controller 240 may read features 1, 5, 0, and 6 among the image 410 from the on-chip memory 230 at the $1^{st}$ boundary 111 of FIG. 1. Also, the flow controller 240 may read features 0, 6, 3, and 0 among the image 410 at the $2^{nd}$ boundary 112. Further, the flow controller 240 may read features 3, 0, 4, and 8 among the image 410 at the $3^{rd}$ boundary 113. Furthermore, the flow controller 240 may read features 5, 0, 6, and 10 among the image 410 at the $4^{th}$ boundary 114. FIG. 4B illustrates that the feature values of the image 410 stored in the on-chip memory 230 are duplicated by such a repetitive read operation of the flow controller 240.

Furthermore, the flow controller 240 may repeatedly read the filter 420 stored in the on-chip memory 230 nine times as indicated by an arrow ×9, thereby reading the weight values of the filter 420. That is, a method of repeatedly reading four weights similarly to the boundary size may be used. FIG. 4B illustrates that the weight values of the filter 420 stored in the on-chip memory 230 are duplicated by such a repetitive read operation of the flow controller 240.

In FIG. 4B, a reference numeral 430 may represent a result that the features and the weights read from the on-chip memory 230 are written in the temporary memory 250. Referring to the reference numeral 430, it can be seen that the features and the weights are stored in 36 points Point 0 to Point 35 of the on-chip memory 230. The boundary flag is used to distinguish a boundary of the features and the weights. For example, it can be seen that the boundary flag value is changed from 0→1→0→1 whenever the boundary is changed.

Referring to FIGS. 4A and 4B, it can be seen that the feature values and the weight values are repeatedly accessed in the process in which the image 410 and the filter 420 stored in the on-chip memory 230 are stored in the temporary memory 250, so that some of the feature values and the weight values are duplicated.

Figure 5:
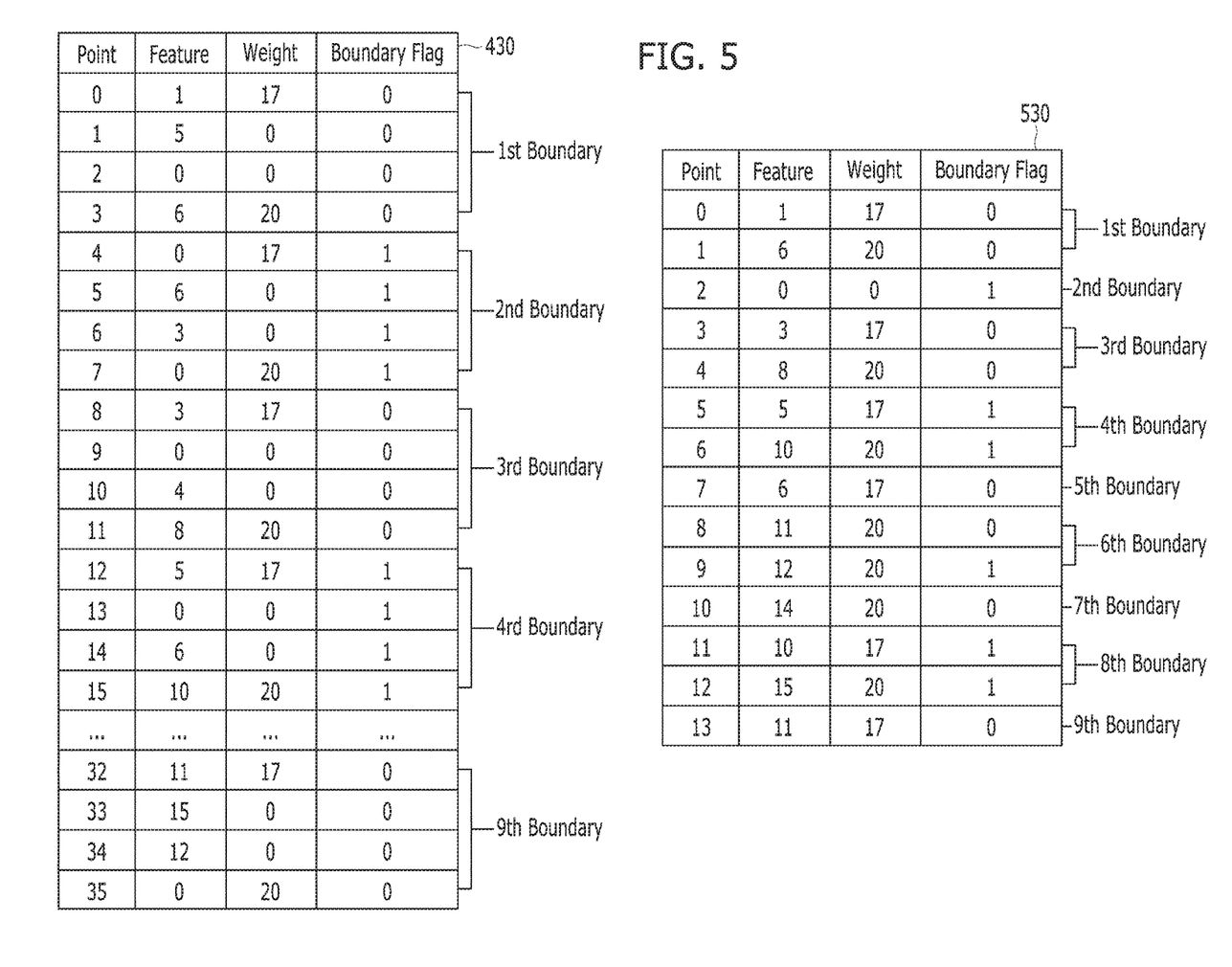
FIG. 5 is a diagram illustrating a process in which a flow controller reads an image and a filter stored in an on-chip memory and writes the read image and filter in a temporary memory.

FIG. 5 is a diagram illustrating a process in which the flow controller 240 reads the image 410 and the filter 420 stored in the on-chip memory 230 and writes the read image 410 and filter 420 in the temporary memory 250. By way of example, FIG. 5 illustrates that the flow controller 240 uses the zero-skipping scheme. Since the format of the image 410 and the filter 420 stored in the on-chip memory 230 and the process in which the flow controller 240 accesses the image 410 and the filter 420 are the same as FIGS. 4A and 4B, illustration thereof will be omitted.

The flow controller 240 may perform the zero-skipping scheme in accordance with the following schemes (Scheme 1) and (Scheme 2).

(Scheme 1) When at least one of a feature and a weight to be stored at the same point of the temporary memory 250 has a value of 0, the flow controller 240 may skip the point. Specifically, when at least one of a feature and a weight read from the on-chip memory 230 has a value of 0, the flow controller 240 may store the value in the temporary memory 250 and then hold a value of a point at which the value is to be written. The value of the point, at which the value is to be written, is not increased but held, so that a new value (i.e., a value that would have been originally stored at the next point) may be overwritten at the point of the temporary memory 250.

The left side 430 of FIG. 5 represents a case where no zero-skipping scheme is used and features and weights are stored in the temporary memory 250. The right side 530 of FIG. 5 represents a case where the zero-skipping scheme is used and features and weights are stored in the temporary memory 250. It can be seen that the points (for example, Points 1, 2, 4, 5 and the like) at which at least one of the feature and the weight includes a value of 0 are overwritten in the left side 430, and such points are removed in the right side 530.

(Scheme 2) The flow controller 240 may control at least one point not to be overwritten within the same boundary. This is because, when four points within the boundary are all overwritten, the boundary disappears and a convolution result value of the boundary may not be derived. At the $2^{nd}$ boundary on the left side 430, the four points (i.e., Points 4 to 7) are all subjected to zero skipping, and when these are all skipped, it is not possible to derive a result that the convolution operation value of the $2^{nd}$ boundary is 0. Accordingly, in such a case, the flow controller 240 may write a value of 0 in the feature and the weight and distinguish boundaries from one another through the boundary flags. The point (Point 2) on the right side 530 is a value indicating the $2^{nd}$ boundary, and when the processing element 260 calculates this value, it is possible to derive the result that the convolution operation result of the $2^{nd}$ boundary is 0.

When the zero-skipping operation is performed using the aforementioned schemes (Scheme 1) and (Scheme 2), since it is possible to remove points having no influence on operation result values among the points of the temporary memory 250, it is possible to prevent unnecessary operations of the processing element 260 and thus waste of time and current waste due to the unnecessary operations. Furthermore, since the zero skipping is performed but all points within the boundary are prevented from being skipped, the boundary may not be omitted.

Figure 6:
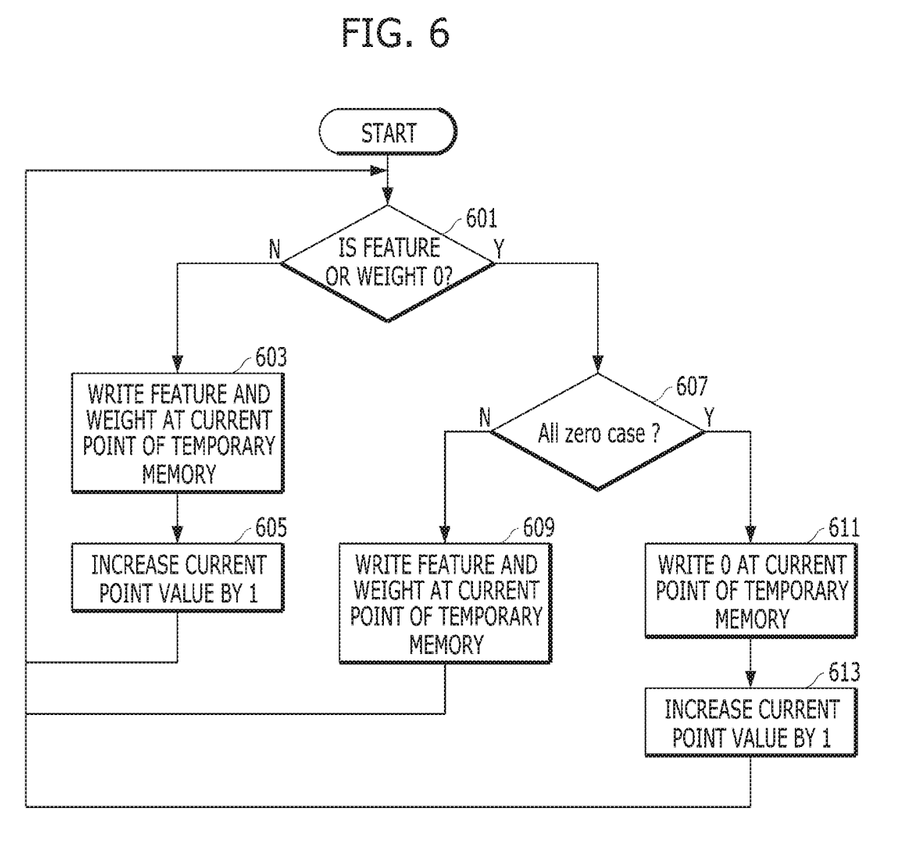
FIG. 6 is a flowchart illustrating an operation in which a flow controller writes a feature and a weight in a temporary memory.

FIG. 6 is a flowchart illustrating an operation in which the flow controller 240 writes a feature and a weight in the temporary memory 250.

Referring to FIG. 6, the flow controller 240 may determine whether a feature or a weight to be written includes a value of 0 (601).

When it is determined that neither of the feature and the weight includes the value of 0 (N in 601), the feature and the weight may be written at a current point of the temporary memory 250 (603).

Furthermore, a boundary flag for distinguishing the boundary of the current point may also be written.

The value of the current point may be increased by a value of 1 (605), and step 601 may be performed again in order to write next feature and weight in the temporary memory 250.

When it is determined that the feature or the weight includes the value of 0 (Y in 601), it may be determined whether all points within the boundary include zeros, that is, all zero case to be subjected to zero-skipping (607).

When it is determined that it is not the all zero case (N in 607), the feature and the weight may be written at the current point of the temporary memory 250 (609). In order to write the next feature and weight in the temporary memory 250 while the value of the current point remains unchanged without being increased, that is, in order to overwrite the feature and the weight written in step 609, step 601 may be performed again.

When it is determined that it is the all zero case (Y in 607), a value of 0 may be written in the feature and the weight of the current point of the temporary memory 250 (611). Furthermore, a boundary flag for distinguishing the boundary of the current point may also be written. Furthermore, in order to substantially prevent the entire boundary from being overwritten, the value of the current point may be increased by a value of 1 (613). Then, step 601 may be performed again in order to write next feature and weight in the temporary memory 250.

When the flow controller 240 operates as illustrated in FIG. 6, features, weights, and boundary flags may be written in the temporary memory 250 similarly to the right side 530 of FIG. 5.

The aforementioned embodiment exemplifies that the flow controller 240 has implemented zero-skipping in such a manner that a new value is overwritten by holding a value of a write target point in the temporary memory 250 without increasing the value. However, differently from this, it is of course that the zero-skipping operation may also be performed in such a manner that the flow controller 240 substantially prevents a feature and a weight to be subjected to zero-skipping from being written in the temporary memory 250. Even in such a case, at least one point within the same boundary should be written in the temporary memory 250 so that the boundary may be distinguished.

Although various embodiments have been described for illustrative purposes, it will be apparent to those skilled in the art that various changes and modifications may be made without departing from the spirit and scope of the invention as defined in the following claims.

What is claimed is:

1. A processing system comprising:
   a temporary memory;
   a flow controller configured to control a feature and a weight to be stored at a point of the temporary memory, and, when at least one of the feature and the weight has a value of 0, to control next feature and next weight to be overwritten at the point; and
   a processing element configured to perform a multiplication operation on a value of the feature and a value of the weight in the temporary memory and an addition operation on the multiplication result,
   wherein the temporary memory further stores a boundary flag indicating a boundary of a convolution operation of features and weights, in the temporary memory.

2. The processing system of claim 1, wherein the temporary memory includes multiple boundaries each of which includes a plurality of points and the flow controller controls at least one point in each of the multiple boundaries not to be overwritten.

3. The processing system of claim 1, wherein the temporary memory includes multiple boundaries each of which includes a plurality of points, and wherein, when all points corresponding to a same boundary among the multiple boundaries are determined to be overwritten, the flow controller writes at least one of a feature and a weight as 0 at one point of the boundary and stores the boundary flag.

4. The processing system of claim 1, wherein the temporary memory includes a scratch pad.

5. A processing system comprising:
   a temporary memory including multiple boundaries each of which includes a plurality of points;
   a flow controller configured to control a feature, a weight, and a boundary flag to be stored at each of the points of the temporary memory, and, when at least one of the feature and the weight of one point of the plurality of points has a value of 0, to control next feature and weight to be overwritten at the one point; and
   a processing element configured to perform a multiplication operation on a value of a feature and a value of a weight stored at each of the points in the temporary memory, and an addition operation on multiplication operation results of each of the boundaries,
   wherein the flow controller controls at least one point in each of the multiple boundaries not to be overwritten.

6. A processing system comprising:
   a temporary memory including multiple boundaries each of which includes a plurality of points;
   a flow controller configured to control a feature, a weight, and a boundary flag to be stored at each of the points of the temporary memory, and, when at least one of the feature and the weight of one point of the plurality of points has a value of 0, to control next feature and weight to be overwritten at the one point; and
   a processing element configured to perform a multiplication operation on a value of a feature and a value of a weight stored at each of the points in the temporary memory, and an addition operation on multiplication operation results of each of the boundaries,
   when all points corresponding to one boundary are determined to be overwritten, the flow controller writes at least one of a feature and a weight as 0 at one point of the one boundary and stores the boundary flag.

7. The processing system of claim 5, wherein the processing element comprises:
   a multiplier configured to multiply the value of the feature and the value of the weight stored at each of the points of the temporary memory;
   an adder configured to perform an addition operation on the multiplication operation results of the multiplier;
   a register array configured to store the addition operation result of the adder; and
   a boundary controller configured to receive the boundary flag, control the register array such that the multiplication operation results of each of the boundaries are added, and control the addition operation result to be outputted from the register array for each boundary.

8. The processing system of claim 5, further comprising:
   a main memory;
   a memory interface configured to access the main memory; and
   an on-chip memory configured to store features and weights read from the main memory through the memory interface,
   wherein the flow controller stores the features and weights stored in the on-chip memory in the temporary memory.

9. The processing system of claim 8, wherein the flow controller repeatedly reads and duplicates some of the features stored in the on-chip memory in the process in which the features stored in the on-chip memory are stored in the temporary memory.

10. The processing system of claim 8, wherein further comprising:
a feature map generator configured to perform post-processing the operation result of the processing element.

11. The processing system of claim 8, wherein the main memory includes a dynamic random access memory (DRAM), and
the on-chip memory includes a static random access memory (SRAM).

12. The processing system of claim 5, wherein the temporary memory includes a scratch pad.

13. The processing system of claim 5, further comprising:
a plurality of processing elements and a plurality of flow controllers.

14. A processing system comprising:
a temporary memory;
a flow controller configured to control a feature and a weight to be stored at a point of the temporary memory, and, when at least one of a next feature and a next weight to be stored at the point of the temporary memory includes a value of 0, to control the next feature and the next weight not to be stored in the temporary memory; and
a processing element configured to perform a multiplication operation on a value of the feature and a value of the weight, which are stored in the temporary memory, and an addition operation on the multiplication result,
wherein the temporary memory further stores a boundary flag indicating a boundary of the feature and the weight that are stored in the temporary memory, and
wherein the temporary memory includes multiple boundaries each of which includes a plurality of points, and the flow controller controls at least one point within each of the boundary among the multiple boundaries to be stored in the temporary memory.

* * * * *